(12) United States Patent
Yates et al.

(10) Patent No.: US 10,065,193 B2
(45) Date of Patent: Sep. 4, 2018

(54) PROCESSING OF GRAINS AND THE LIKE

(75) Inventors: James P. Yates, Charleston, IL (US); Charles A. Arnold, Lakewood, CO (US); William E. Hahn, Aurora, CO (US); Jeffrey A. Gwirtz, Manhattan, KS (US); R. Carl Hoseney, Manhattan, KS (US); Melva Hahn, legal representative, Aurora, CO (US)

(73) Assignee: Micronizing Technologies, LLC, Allen, TX (US)

( * ) Notice: Subject to any disclaimer, the term of this patent is extended or adjusted under 35 U.S.C. 154(b) by 1386 days.

(21) Appl. No.: 11/920,105

(22) PCT Filed: May 8, 2006

(86) PCT No.: PCT/US2006/018041
§ 371 (c)(1),
(2), (4) Date: Aug. 6, 2009

(87) PCT Pub. No.: WO2006/124440
PCT Pub. Date: Nov. 23, 2006

(65) Prior Publication Data
US 2010/0021611 A1    Jan. 28, 2010

Related U.S. Application Data

(60) Provisional application No. 60/680,346, filed on May 11, 2005.

(51) Int. Cl.
| | |
|---|---|
| *B02C 9/00* | (2006.01) |
| *B02C 19/00* | (2006.01) |
| *B02C 19/18* | (2006.01) |
| *A23L 7/10* | (2016.01) |

(52) U.S. Cl.
CPC ............... *B02C 9/00* (2013.01); *A23L 7/198* (2016.08); *B02C 19/005* (2013.01); *B02C 19/18* (2013.01)

(58) Field of Classification Search
CPC .. B02C 9/00; B02C 9/02; B02C 19/00; B02C 19/18; A23L 7/198
USPC .................................................. 241/1, 6–12
See application file for complete search history.

(56) References Cited

U.S. PATENT DOCUMENTS

| | | | |
|---|---|---|---|
| 1,442,304 A * | 1/1923 | Spencer | A23P 30/36 241/1 |
| 3,661,593 A * | 5/1972 | Christianson | A23J 1/12 127/67 |
| 5,063,078 A | 11/1991 | Foehse | |
| 5,089,282 A | 2/1992 | Wellman | |
| 5,104,671 A | 4/1992 | Wellman | |
| 5,114,079 A | 5/1992 | Curran | |
| 5,137,133 A | 8/1992 | Graton et al. | |
| 5,192,028 A | 3/1993 | Curran | |
| 5,194,287 A * | 3/1993 | Wellman | B02B 5/02 426/483 |
| 5,352,473 A | 10/1994 | Chiqurupati et al. | |
| 5,433,966 A | 7/1995 | Wolt et al. | |
| 5,523,109 A | 6/1996 | Hellweg et al. | |
| 5,789,012 A | 8/1998 | Slimak | |
| 6,083,547 A | 7/2000 | Katta et al. | |
| 6,135,370 A | 10/2000 | Arnold | |
| 6,277,473 B1 | 8/2001 | McGinn | |
| 6,405,948 B1 * | 6/2002 | Hahn | B02C 13/18 241/1 |
| 6,726,133 B2 | 4/2004 | Hahn et al. | |
| 6,808,726 B2 | 10/2004 | Hojo et al. | |

* cited by examiner

*Primary Examiner* — Faye Francis
(74) *Attorney, Agent, or Firm* — Shannon Bates; Harper Bates & Champion LLP

(57) ABSTRACT

Methods for processing of grains and the like and products produced by such processing, the invention in preferred embodiments subjects whole grains or portions of grains to rapid pressure and directional changes in a high velocity fluid stream to instantaneously vary forces acting thereon. Flours of reduced particle sizes having low starch value damage result, the present processing also permitting uniform blending of additives such as during comminution of the grains. Processed grains according to the invention are resistant to spoilage and clumping. Whole grain flours and white flours can be produced according to the invention. Bran, germ and endosperm of grains can also be separated.

12 Claims, No Drawings

PROCESSING OF GRAINS AND THE LIKE

CROSS-REFERENCE TO RELATED APPLICATIONS

This application is the National Stage Application of International Application No. PCT/US2006/018041 filed on May 8, 2006, which claims the benefit of U.S. Provisional Application No. 60/680,346 filed on May 11, 2005.

TECHNICAL FIELD

The invention relates generally to the processing of grains and the like to produce comminuted grain products such as flours and particularly relates to non-impact processing of grains such as by subjection thereof to resonance disintegration.

BACKGROUND ART

Grains processed to relatively fine particle sizes have been known since prior to recorded history. Apparatus used for processing of various grains to fine particles or flours have advanced from stone implements to present day roller mills, pin mills and the like, the common denominator of many prior systems being the impact nature of prior grinding processes. In such impact processing, relatively high damage starch values are commonplace with certain grains. Whole grains, in particular, while recommended in the diet, are processed in most prior art situations with a resulting flour characterized by the presence of large pieces of bran, thus yielding a flour not suitable for the expectations of modern baking practices. Whole grain flours processed according to prior art methodology further lack an acceptable, uniform appearance and are subject to becoming rancid under normal storage conditions as well as subject to infestation by insects and the like that feed on flours. Grains have previously been processed to particle sizes on the order often microns, such particle sizes being typically referred to as ultra-fine flours. U.S. Pat. No. 6,083,547 discloses the use of a hammer mill to produce a flour of an average particle size of approximately 36 microns followed by processing in a pin mill to achieve a finer particle size. Flour having an increased shelf life is disclosed in U.S. Pat. No. 5,433,966, the flour being treated in a heated carrier gas to dry the flour to a moisture content of less than seven weight percent. U.S. Pat. No. 5,352,473 also discloses heat treatment of flour to reduce the moisture content of the resulting flour. Production of a whole grain oat flour is disclosed in U.S. Pat. No. 5,523,109. Flours prepared from a variety of natural sources are disclosed in U.S. Pat. No. 5,789,012 inter alia. Wheat is processed to produce white flour by removal of at least portions of the bran layer of the wheat grain from the endosperm and germ portions thereof followed by grinding in a roller mill to produce a flour of a relatively fine state as is disclosed in U.S. Pat. Nos. 5,114,079 and 5,192,028. U.S. Pat. Nos. 5,194,287; 5,089,282 and 5,104,671 disclose pearling of wheat to remove outer layers of bran and germ followed by grinding in a roller mill. In U.S. Pat. No. 5,063,078, flours are disclosed having high soluble dietary fiber content, the process including grinding in a pin mill to a particle size in the range of 30 to 60 microns. U.S. Pat. No. 5,137,133 discloses "micronized" grains cooked and heated to form particles of relatively large sizes but which are referred to as having been micronized.

The prior art has not contemplated the processing of grains whether whole or partial grains by subjection of such material to resonance disintegration processes according to preferred embodiments of the invention, processing according to the invention reducing the grains to "flours" of consistent particle sizes and uniform appearance without impacts and thus without crushing with the usual high damage starch values as occurs with impact grinding. Flours produced according to the invention are of enhanced quality and are resistant to rancidity yet retain acceptable baking performance whether or not rehydrated. Whole grain flours produced according to preferred methods are improved when compared to typical whole grain flours produced by impact milling processes. Processing of whole or partial grains according to preferred embodiments of the invention therefore constitute substantial advances in the art.

DISCLOSURE OF INVENTION

The disclosures of U.S. Pat. Nos. 6,135,370; 6,227,473; 6,405,948; 6,726,133; 5,433,966 and 6,083,547 are incorporated hereinto by reference.

The invention herein disclosed encompasses methodology for reducing grains and similar materials as disclosed herein to particle sizes on the order of conventional flours and flours of particle sizes having characteristics not previously known in the art. Flours and the like produced according to preferred embodiments of the invention exhibit high quality and improved shelf life. Processing according to the invention also permits separation of bran, germ and endosperm in certain embodiments of the invention. Whole grain flours including white flours can be produced according to embodiments of the invention with characteristics as noted herein. The methodology of the invention preferably comprises subjection of grains and the like to alternating increasing and decreasing pressures, which may include shock waves, with abrupt directional changes in a high velocity stream to produce essentially instantaneous changes in forces acting thereon, thereby to reduce the material so processed along natural cleavage planes and along physiochemical boundaries therein with a resulting decrease in particle size of the grains and similar materials being processed. The methods of the invention are preferably practiced within apparatus such as is disclosed in the aforesaid United States patents incorporated hereinto by reference, such processing occurring in a substantially non-impact or low-impact manner with energy efficiencies not possible with processes involving crushing of grains and the like to produce flours by conventional processing. In the methods of the invention, grains and similar materials are reduced to particles while effectively avoiding mechanical crushing as occurs with use of prior apparatus such as pin mills and the like which invariably cause starch damage among other deleterious affects.

In preferred embodiments of the invention, grains and similar materials are fed into an input of a resonance disintegration mill such as is disclosed in certain of the United States patents incorporated hereinto by reference, the grains becoming immediately entrained in a gaseous flow created by a plurality of rotors moving at speeds on the order of 2500 to 5000 rpm as an exemplary range of rotational speeds. The alternating increasing and decreasing pressures to which the grains are subjected causes the grains to flow in an alternating outward and inward flow around peripheral edges of said rotors and through orifices formed in plated positioned between adjacently located pairs of the plurality of rotors, each orifice plate extending inwardly from internal walls of a housing containing the rotors and orifice plates to a central aperture that provides an orifice about a shaft to which the rotors are mounted for rotation. Pressures acting on the grains alternately increase and decrease as flow passes through each orifice and expands in that space below each orifice plate. Compression and decompression occurs in the flow as vanes on the rotors pass by static structure contained within the housing. The compressions and decompressions may differ in magnitude and duration. The flow of material within the mill is substantially without high angle impacts of the grains on structural portions of the mill.

Rotors employed in suitable non-impact or low-impact mills can be angularly offset from each other so that compressions and decompressions are not synchronized. Establishment of a series of compressions and decompressions can occur at different frequencies depending on the number of rotors, the number of apices on the rotors and the number of static interdigitating elements disposed within the housing as well as other structural characteristics of the mill. Pressure change frequencies can be tuned to resonate to characteristics of a particular grain or similar material to more effectively process particular grains.

Processing of grains and similar materials according to the invention results in comminution of the grains via resonance and shearing forces without substantial impact with machine surfaces or with other particles being processed such that the material being reduced to flour-sized particles is not crushed or partially destroyed in the process of being reduced in particle size. Much less energy is expended in practice of the present processes in the production of the present compositions of matter in the formation of clean, naturally cleaved products. The resistance of flours produced according to the invention to rancidity appears to be due to a possible distribution and integration of natural antioxidants as well as a reduction in natural enzyme degradation resulting from comminution of grains from the inside out without crushing and bruising. Advantages so noted appear to occur due to the retention of lipids in a form present in the grains themselves. Flours with relatively narrow particle distribution curves result according to the processes of the invention. A resonance disintegration mill used in practice of the invention and as is disclosed in the patents incorporated hereinto by reference exhibits numerous advantages over conventional mechanical grinding or impact comminution apparatus. The mill referred to herein can be operated at different speeds and within a wide range of different frequencies as described herein.

The invention further contemplates blending of additives with flours either during or subsequent to formation of the flours by subjection to resonance disintegration processing to evenly distribute such additives within the flours, such additives comprising ferric pyrophosphate, ferrous phosphate and the like and which can be fully blended and formed via a single processing pass through a resonance disintegration mill. Flours resulting from processing according to the invention is resistant to clumping and is more bioavailable in situations wherein the materials processed are relatively insoluble or substantially insoluble in water.

Accordingly, it is an object of the invention to process grains and the like to produce flours and the like including whole wheat flour and white flours from grains subjected to comminution by subjection to non-impact processing such as resonance disintegration processing.

It is another object of the invention to produce flours and the like from grains and similar materials, the flours being resistant to clumping and spoilage and exhibiting low starch damage while being characterized by favorable baking and other utility.

It is a further object of the invention to process grains and similar materials via substantially non-impact processing with favorable energy expenditure relative to prior flour production methodologies.

Further objects and advantages of the invention will become more readily apparent from consideration of the following detailed description of the preferred embodiments thereof.

BEST MODE FOR CARRYING OUT THE INVENTION

Materials processed according to the invention to produce compositions of matter unique to the invention are generally classified as grains but include any material which, on reduction to particle sizes on the order of those sizes conventionally associated with flours and the like, are capable of use as flours in baking and other utilization of flours as are known in the art. As examples, wheat including Durum wheat, Hard Red Spring wheat, Hard Red Winter wheat, Soft Red Winter wheat, Hard White wheat, Soft White wheat, Unclassed wheat and Mixed wheat according to United States Standards for Wheat as published in May of 1999, as well as mixtures thereof, is expressly included in the definition provided herein of grains and is included in the disclosure provided herein on use of the term "grains". Wheats of Special Grades and tempered wheats are further included in the definition of grains as referred to herein.

The definition of grains as contemplated herein further refers to seeds such as from legumes including seeds more normally used as animal feed such as grain sorghum or milo, at least certain products produced according to the invention being useful as animal feed. Barley, corn, oats, rice, rye and other vegetable matter such as potatoes and the like and which are capable of reduction to flours and the like whether first dehydrated or hydrated are also included within the definition of grains as intended herein. Flour as defined herein includes semolina and farina as well as similar products resulting from the reduction in particle sizes of grains as defined herein whether such particle sizes are in whole or in part of sizes corresponding to typical particle sizes of conventional flours. Edible seeds and particularly seeds surrounded by a pericarp and wherein the seed includes a germ, an endosperm and a seed coat, are included within the present definition of grains. Those materials disclosed in U.S. Pat. No. 5,789,012, the disclosure of which is incorporated hereinto by reference, are further included in the definition of grains as used herein, such materials including white sweet potatoes, cassava, edible roots, tropical yams, lotus, arrowhead, buckbean, amarantha, mesquite beans and the like including seeds, starchy fruits including potatoes, arrowroot, water chestnut, sugar beets, jicama, buckwheat, legumes, millet, milo, teff, cotton seed, flax, soy, bread fruit, pumpkin, winter squash, white squash, plantain, banana, and jack fruit as well as more usual vegetative matter more often referred to as grains including barley, oats, corn, rice and the like.

Grains as defined above are subjected as whole materials or as at least partially fragmented materials to resonance disintegration processing such as within a resonance disintegration mill to reduce said grains to particle sizes of reduced dimensions such as on the order of particle sizes commonly associated with flours and the like as defined herein. Grains are subjected according to the invention to resonance and shearing forces by application of the physics of destructive resonance, shock waves and vortex-generated shearing forces to selectively differentiate and fragment particles in complex multi-phase materials such grains as defined herein. Conventional milling methods operate to simply crush and possibly micronize wheats and the like with a resultant damage to starches, proteins and the like present in such wheats and the like including grains as defined herein and with relatively high energy costs. Milling according to the invention incrementally increases the magnitude of shock waves generated within a mill and phases forces to enhance process efficiency while minimizing energy transfer to structural portions of the mill and to the materials being processed. Grains are fragmented according to the invention from within according to practice of the present methods rather than being crushed by impacts as in grinding processes. The grains thereby cleave along internal planes most susceptible to separation, those most favorable planes in grains being boundaries between portions of the grains such as the germ and endosperm as examples of at least some of the grains as defined herein.

Seeds and the like such as are useful in the production of meals not necessarily used as feedstuffs for human and/or animal consumption can also be processed according to the invention to yield benefits such as are referred to herein. Meals within the standard meaning of this term can also be prepared according to the invention and are included within the definition of "flours" as referred to herein.

According to preferred methods of practicing the present invention, grains are fed into a resonance disintegration mill such as is disclosed in at least certain of the United States patents incorporated hereinto to reduce the grains to particle sizes distributed about a mean particle size less than 100 microns and preferably less than 50 microns. Processing in air, steam or other gas can preferably occur at rotational speeds between 2000 and 5000 rpms as exemplary rotational speeds. Resonance can be created according to the invention by pulses generated by increasing and decreasing pressure changes acting on the grains. In high velocity streams containing the grains, shearing forces and g-forces act to reduce particle size, all such size reduction mechanisms occurring substantially without impact between the particles and without impact between the particles and surfaces of apparatus employed to generate resonance acting on the particles or to generate other affects on the particles. Inducers, transducers and resonance disintegration mills such as are disclosed at in at least certain of the patents incorporated hereinto by reference induce resonance in the materials to reduce particle sizes without impact affects on the particles. Non-canceling harmonics can be utilized to facilitate resonance processing and speeds within entrained flows can be varied according to the definition of processing according to the invention. Resonance processing in vertically-oriented or horizontally-oriented mills can be effected according to the invention. Standing waves can be generated within such mills to facilitate non-impact reduction of particle sizes.

The invention encompasses processes for production of useful flours and the like form whole or partial grains by subjection of said grains to resonance processing whether not within apparatus such as the resonance disintegration mills disclosed in at least certain of the United States patents incorporated hereinto by reference. The invention further encompasses composition of matter resulting from such processing to include flours produced by non-impact processing and by resonance disintegration processing as well as doughs and cooked products resulting from use of such flours. Compositions of matter according to the invention include but are not limited to flours of a particle size and moisture content resulting from processing of grains according to the invention while are resistant to spoilage. Flours produced according to the invention include but are not limited to whole grain flours and flours produced from the entirety of the grains identified herein. The invention herein disclosed further includes but is not limited to processes for production of flours having a particle size within a micron-sized range and which are resistant to clumping, such flours being blendable according to the invention with additives such as ferric pyrophosphate, ferrous phosphate, magnesium compounds such as magnesium chloride and the like, such additive and flour mixtures being essentially fully blended without clumping by single step processing that can include flour production in concert with additive blending. In such blending processes, the grains used to produce the flours and the additives can be reduced in particle size to the same degree or to differing degrees through simultaneous reduction of particle size of the respective components of such mixtures through resonance or other non-impact processing. The processes of the invention appear to reduce bacterial levels in the resulting flours and similar compositions of matter produced according to the invention, the compositions being typically reduced in moisture content and being resistant to spoilage. White flours can further be produced according to the invention from whole grains and particularly wheat grains. Processing according to the invention can further function to separate bran from germ and endosperm in grains so configured and especially wheat grains, thereby yielding compositions of matter according to the invention wherein grain brans and grain germs and endosperms are separate and can be separated. The invention further contemplates rehydration of grains processed according to the invention. Compositions of matter produced according to the invention include but are not limited to flours having small particle sizes in micron size ranges and which exhibit triboelectric character resulting in forces within the compositions of matter that cause particles to remain unaggregated at least in part. The compositions of matter produced according to the invention exhibit relatively uniform particle sizes relative to conventional flours and the like and which exhibit low damage starch values. Grains useful in the practice of the several embodiments of the invention can be tempered or untempered. Particle sizes of flour produced according to the invention can be less than micron in size at least in part and can have mean particle sizes of less than one micron.

Flours produced according to the invention have uniform appearances and exhibit textures different from typical whole grain flours. The tendency of impact-produced flours toward rancidity is alleviated according to the present invention by the present processing through preservation of natural "packaging" of core particles in view of cleavage of the grains along natural planes throughout particle size distribution ranges. The present processing further acts to control oxidation with resulting quality enhancement believed due also to lack of protein destruction.

Flours are produced according to the invention with moisture content below five percent, such moisture levels contributing to the stability of the flours so produced. Rehydration of flours reduced to moisture levels of approximately five percent or less in the prior art, such as by heating to drive off moisture, has been difficult due to the fact that starch in such flours gelatinize on addition of water. Such prior art flours were and are produced by processing such as with a roller mill, pin mill and apparatus causing impact between material and processing structure. Since the flours of the inventions are not subjected in any substantial manner to impacts, the flour particles do not gelatinize when water is added thereto even though moisture content is below five percent. The invention therefore contemplates rehydration of flours processed to moisture levels below levels such as five percent without gelatinization, the flours so rehydrated therefore being useful for baking and the like.

Untempered wheat processed at 4000 rpm and then at 4500 rpm in a resonance disintegration mill as disclosed herein can produce whole wheat flour of a primary particle size distribution of D50 with further processing permitting even greater size reduction. The resulting flour is devoid of large bran particles and remains stable and without signs of spoilage one year after processing from the original wheat grain. Organoleptic qualities of the flour are excellent and baking with the flour whether or not hydrated to moisture levels between eight and fifteen percent is acceptable. Nutrient levels of the flour are identical to nutrient levels of the wheat grain used to produce the flour, enrichment being unnecessary. Energy costs necessary to produce the whole wheat flour are reduced relative to costs for producing whole wheat flours conventionally.

Tempered wheat having a moisture level of approximately sixteen percent and processed in a resonance disintegration mill as disclosed herein produces a flour of near white coloration with low ash content and with exceptional baking properties. Damage starch values for the flour were lower than occurs with commercially milled flours. The resonance disintegration mill was operated at 4500 rpm in a clockwise sense with sifting and reprocessing of purified fractions to yield a true whole wheat flour.

Exceptionally stable flours produced according to the invention and having low moisture contents sufficient to resist spoilage for extremely long periods of time can be rehydrated to provide improved organoleptic and appearance characteristics in baked goods produced with the flours. The flours can be misted with water prior to use as a baking material. Also, a one hundred percent sponge baking procedure can be utilized.

Processing of grains and whole grains in particular according to the invention produces flour particles having little or no oils initially existing in the grains smeared over surfaces of the flour particles. Such oils include fatty acids that, when released from natural locations within grains by impact processing, begin to oxidize to aldehydes, alcohols and peroxides, thereby causing the resulting prior art flour to degrade as a stable foodstuff, and to lose organoleptic and nutritional value. Processing according to the invention reduces or eliminates any release and/or smearing of the oils inherently present in the grains with the result that oxidation is held in check. Whole grain flours, typically ground by impact processing, are preferably used in the prior art virtually immediately due to the fact that spoilage immediately begins. Whole wheat grains produced according to the invention are shelf-stable with no appreciable spoilage or loss of nutritional value due in part to the fact that oils inherently present in the grains do not oxidize appreciably. The flours thus produced according to the present invention are not only resistant to spoilage but also do not introduce into the digestive system of a consumer the oxidation products present in conventional flours. Therefore, the flours of the invention are more natural foods and are not harmful to a consumer of same due to the relative lack of oxidation products in the present flours. Further, processing of grains by impact processing damages the grains such as by damaging starches and the like, thereby facilitating enzymatic degradation by amylase and the like. The reduction in moisture levels in the flours processed according to the invention also tends to neutralize amylase and other enzymatic activity. The rapid, non-impact processing afforded by the invention causes oils and the like within the grains to remain in natural "packets" or inclusions, that is, these inclusions remain essentially intact and are thus not spread or smeared over surfaces of the flour particulate, adsorbed thereon or absorbed into the particles. Oxidation can also be decreased by processing of grains according to the invention in gaseous atmospheres such as nitrogen and other atmospheres from which oxygen has been substantially removed.

Rancidity testing conducted on flours produced according to the invention involved samples subjected to resonance disintegration processing at different times, stored at different temperatures and containing different moisture contents. One sample resulting from processing of untempered wheat by subjection to resonance disintegration at 4000 rpm and then at 4500 rpm had a moisture content of 3.7%. Storage of the flour at room temperature for up to sixty days followed by testing for free fatty acid content showed a minor increase in free fatty acid levels with no spoilage including mold formation. The flour so produced was also resistant to insect infestation.

Particle size distribution of flours produced according to the invention have mean values in a range of 100 microns and less for differing grains, these mean values being reducible as desired by multiple passes through a resonance disintegration mill as disclosed herein. Wheat, rice, rye, soy bean, whole kernel corn, and the like processed according to the invention resulted in flours of particle sizes in micron ranges and with reduced moisture content and resistance to spoilage.

Additives blended with the flours produced according to the invention include ferric pyrophosphate and ferrous phosphate and can be blended with the flours after flour production or processed as a mixture of grains and additives, the particle size of both grains and additives being reduced to desired particle size ranges simultaneously with the degree of size reduction varying depending on applied frequencies. In either processing route, the resulting flour mixture is consistent in concentration of additive throughout the flours. The disclosure of U.S. Pat. No. 6,808,726 relating to use of ferric pyrophosphate inter alia as a food additive is incorporated hereinto by reference. The disclosures of U.S. Pat. Nos. 5,114,079 and 5,192,9028 are incorporated hereinto by reference. Production of whole wheat white four according to the invention can be accomplished by removal of a bran portion from a germ portion and an endosperm portion of the wheat grains and can comprise initial tempering of the wheat grains to a total moisture level of approximately 14 to 17%; breaking of the bran portion from the endosperm and germ portions by subjection of the tempered wheat grains to resonance processing, typically at lower speeds in a resonance disintegration mill than used for production of flours and particles, and classifying the resulting material to separate at least a portion of the bran portion from the endosperm and germ portions. The endosperm and germ portions can then be processed if not used as is to particle sizes of desired ranges within a resonance disintegration mill, the resulting white flour having low moisture content and resistance to spoilage.

Processing according to the invention allows selective differential fragmentation of particles formed of complex multiphase materials whether in air or in differing fluid carriers. Whole wheat and straight grade wheat flours having D50 micron particle sizes are economically produced according to the various embodiments of the invention, the resulting flours having high resistance to spoilage. White flours can also be produced according to the invention at reduced costs and with spoilage resistance as well as excellent use characteristics.

The invention as disclosed herein refers to processing of grains and the like within apparatus capable of acting on said grains in a manner whereby impacts of the grains and particles of said grains resulting from said processing is said to constitute non-impact processing. It is to be understood that the term "non-impact processing" as used herein encompasses processing wherein impacts of said grains and particles of said grains occur but to a degree whereby damage to said grains and said particles of grains as disclosed herein in minimized.

Accordingly, it is to be understood that the invention can be practiced other than as explicitly disclosed herein without departing from the scope of the invention as intended and as recited in the claims appended hereto.

The invention claimed is:

1. A process for producing flour, comprising the steps of:
   providing a resonance disintegration mill for processing grain; and
   subjecting the grain to substantially non-impact processing via resonance and shearing forces in the resonance disintegration mill to reduce, without crushing or partially destroying, the grain to flour particles of substantially uniform size, and having a mean value size of 100 microns or less.

2. The process of claim 1, wherein the step of subjecting the grain to substantially non-impact processing via resonance and shearing forces comprises the step of:
   subjecting the grain to resonance disintegration processing in a resonance disintegration mill.

3. The process of claim 2, wherein the grain is a whole grain and the produced flour is a whole grain flour.

4. The process of claim 3, further comprising the step of:
   subsequent to subjection of the whole grain to the resonance disintegration processing, separating a bran portion of the whole grain to produce the whole grain flour.

5. The process of claim 2, further comprising the step of:
   subjecting a combination of the grain and an additive to the resonance disintegration processing to produce a flour blended with the additive.

6. The process of claim 5, wherein the additive is selected from a group consisting of ferric pyrophosphate, ferrous phosphate and magnesium chloride.

7. The process of claim 2, wherein the produced flour has a D50 of less than 100 microns.

8. The process of claim 2, wherein the produced flour has a reduced moisture content sufficient to resist spoilage.

9. The process of claim 8, further comprising the step of:
   rehydrating the produced flour prior to use in baking.

10. The process of claim 2, wherein the produced flour is resistant to clumping.

11. The process of claim 8, wherein the reduced moisture content of the produced flour results in a bacterial level that is lower than that of flours prepared by impact processes.

12. The process of claim 2, wherein the grain is selected from a group consisting of wheat, barley, rye, oats, rice and corn.

* * * * *